United States Patent
Xue et al.

(10) Patent No.: US 12,508,559 B2
(45) Date of Patent: Dec. 30, 2025

(54) CONTINUOUS GAS SEPARATION SYSTEM COMBINING HYDRATE-BASED PROCESS AND REVERSE OSMOSIS PROCESS AND DISTURBANCE DEVICE

(71) Applicants: CHINA PETROLEUM & CHEMICAL CORPORATION, Beijing (CN); SINOPEC Dalian Research Institute of Petroleum and Petrochemicals Co., Ltd., Liaoning (CN)

(72) Inventors: Qian Xue, Liaoning (CN); Zunzhao Li, Liaoning (CN); Xiaolin Wang, Liaoning (CN); Mingrui Liu, Liaoning (CN); Wei Zhao, Liaoning (CN); Shihan Li, Liaoning (CN); Xiaozhe Sun, Liaoning (CN); Wei Wang, Liaoning (CN)

(73) Assignees: CHINA PETROLEUM & CHEMICAL CORPORATION, Beijing (CN); SINOPEC Dalian Research Institute of Petroleum And Petrochemicals Co., Ltd., Liaoning (CN)

( * ) Notice: Subject to any disclaimer, the term of this patent is extended or adjusted under 35 U.S.C. 154(b) by 440 days.

(21) Appl. No.: 18/249,270

(22) PCT Filed: Oct. 19, 2021

(86) PCT No.: PCT/CN2021/124722
§ 371 (c)(1),
(2) Date: Apr. 17, 2023

(87) PCT Pub. No.: WO2022/083588
PCT Pub. Date: Apr. 28, 2022

(65) Prior Publication Data
US 2023/0415111 A1    Dec. 28, 2023

(30) Foreign Application Priority Data

Oct. 20, 2020    (CN) .......................... 202011121986.X (51) Int. Cl.
*B01F 33/82*    (2022.01)
*B01D 53/22*    (2006.01)
(Continued)

(52) U.S. Cl.
CPC ............ *B01F 33/82* (2022.01); *B01D 53/229* (2013.01); *B01F 23/19* (2022.01); *B01F 25/20* (2022.01);
(Continued)

(58) Field of Classification Search
CPC .............................. B01F 25/20; B01D 46/543
(Continued)

(56) References Cited

U.S. PATENT DOCUMENTS

2003/0080037 A1    5/2003  Mazzei
2016/0271579 A1    9/2016  Li et al.
2018/0148331 A1    5/2018  Li et al.

FOREIGN PATENT DOCUMENTS

CN    101513600 B        1/2012
CN    103537211 A  *     1/2014
(Continued)

*Primary Examiner* — Magali P Slawski
*Assistant Examiner* — Rachel Marie Slaugovsky
(74) *Attorney, Agent, or Firm* — NKL Law; Allen Xue (57) ABSTRACT

A disturbance device has two jet mixers, which are oppositely disposed in the horizontal direction; a mixing chamber, which is connected between the two jet mixers; and mixing pipes, which are connected below the mixing chamber. The mixing pipes comprise: a central pipe, which is a vertical straight pipe; multiple helical pipes, which are wound in multiple layers and provided outside the central pipe, the diameters of the multiple helical pipes gradually increasing from the inner to outer layers, and multiple flow (Continued)

deflector assemblies being provided at intervals in each helical pipe; and an outer sleeve, which is a straight pipe, the outer sleeve being sleeved outside the outermost helical pipe. A continuous gas separation system combines a hydrate-based process and a reverse osmosis process, using the disturbance device, enables continuous gas separation.

20 Claims, 3 Drawing Sheets

(51) Int. Cl.
*B01F 23/10* (2022.01)
*B01F 25/20* (2022.01)
*B01F 25/433* (2022.01)
*B01F 101/00* (2022.01)

(52) U.S. Cl.
CPC .. *B01F 25/4331* (2022.01); *B01F 2101/2204* (2022.01); *C10L 2290/54* (2013.01); *C10L 2290/548* (2013.01)

(58) Field of Classification Search
USPC .......................................................... 261/115
See application file for complete search history.

(56) References Cited

FOREIGN PATENT DOCUMENTS

| CN | 105688630 | A | | 6/2016 | |
|----|-----------|---|---|--------|---|
| CN | 205886828 | U | | 1/2017 | |
| CN | 106474904 | A | | 3/2017 | |
| CN | 106523830 | A | * | 3/2017 | ............. F16L 43/00 |
| CN | 106669582 | A | | 5/2017 | |
| CN | 109603601 | A | | 4/2019 | |
| CN | 110016374 | A | | 7/2019 | |
| CN | 110227331 | A | | 9/2019 | |
| CN | 110469769 | A | | 11/2019 | |
| WO | 2018094789 | A1 | | 5/2018 | |

* cited by examiner

CONTINUOUS GAS SEPARATION SYSTEM COMBINING HYDRATE-BASED PROCESS AND REVERSE OSMOSIS PROCESS AND DISTURBANCE DEVICE

CROSS REFERENCE TO RELATED APPLICATIONS

The present application is a national entry of International Application No. PCT/CN2021/124722 filed on Oct. 19, 2021, which claims the benefits of priority to the Chinese Patent Application No. 202011121986.X filed on Oct. 20, 2020, the content of which is incorporated herein by reference.

FIELD

The present invention relates to the technical field of gas separation based on a hydrate process, in particular to a continuous gas separation system combining hydrate-based process and reverse osmosis process and a disturbance device.

BACKGROUND

Natural gas hydrates are abundant in the earth and are an important potential energy source in the world. In the background of energy crisis, the survey and research on natural gas hydrates has become a global hotspot. Natural gas hydrates are an ice-like crystalline compounds formed by water and natural gas at high pressures and low temperatures. As the researches on the basic physical properties, microstructures, thermal and dynamic characteristics of hydrates are deepened continuously, abundant reserves of natural gas hydrates have been found in tundras and deep oceans, and have received great attention all over the world. It is found that natural gas hydrates can be used not only as a potential clean energy resource but also as a new applied technology for the benefits of mankind.

The basic principle of gas separation through a hydration process is as follows: hydrates are formed from different gasses under different conditions; when hydrates are formed from gas mixture, the component that can form the hydrate easily tends to concentrate in the hydrate phase, thereby gas separation is realized. The gas separation technique based on hydrate is mainly applied to the separation of $CO_2$-containing gas mixtures (flue gas $N_2/CO_2$, natural gas $CH_4/CO_2$, coal-bed gas $CH_4/CO_2$, and synthetic gas $H_2/CO_2$), hydrocarbon gas mixtures ($CH_4$, $C_2H_6$ and $C_2H_4$, etc.), hydrogen-containing gas mixtures (hydrogen-containing refinery gas, ethylene cracking gas, and catalytic cracking dry gas, etc.), and other gas mixtures. However, hydrate-based gas separation methods have their own problems. Firstly, at present, most of the researches are based on laboratory-scale small-size equipment, and are carried out with batch or semi-batch separation methods. In batch operation, two or more sets of reactors are required for continuous production of purified gas, the gas phase can't be extracted from the reactor while the hydrate is formed in the hydrate, the gas separation can't be carried out continuously, and the water solution for forming the hydrate is not recycled. Secondly, during hydrate formation, as the concentration of the target gas of separation is decreased, the separation conditions become more rigorous. In addition, owing to the fact that the gas hydrate formation process is a gas-liquid-solid equilibration process, a certain percentage of target gas for separation still remains in the gas phase after the hydrate formation process is completed. In short, it is unable to capture the target gas from the gas mixture completely by using a hydrate-based gas separation technique solely. Therefore, in order to apply hydrate-based gas separation techniques in the industry, it is necessary to develop a continuous gas separation process, large-size reaction equipment, and a new separation method that couples a hydrate process with other separation processes.

Moreover, for a gas separation device based on a hydrate process, the effect of gas-liquid mixing has direct influences on the hydrate formation efficiency and the separation result. Therefore, there is an urgent need for a design that can strengthen gas-liquid mass transfer and promote efficient hydrate formation.

The information disclosed in this section is only intended to make the background of the present invention understood better, and should not be deemed as acknowledging or implying in any form that the information constitutes the prior art well known to those having ordinary skills in the art.

CONTENTS OF THE INVENTION

An object of the present invention is to provide a continuous gas separation system combining hydrate-based process and reverse osmosis process and a disturbance device, so as to improve hydrate formation and gas separation efficiency.

Another object of the present invention is to provide a continuous gas separation system combining hydrate-based process and reverse osmosis process and a disturbance device, so as to realize continuous and large-scale gas separation for industrial application.

To achieve the above objects, according to a first aspect of the present invention, the present invention provides a disturbance device, which comprises: two jet mixers arranged oppositely in the horizontal direction; a mixing chamber connected between the two jet mixers; and a mixing pipeline connected below the mixing chamber, comprising: a plurality of helical pipes arranged in multiple layers and wound around a central axis of the mixing pipeline, wherein the pipe diameters of the plurality of helical pipes increase gradually from the inner layers to the outer layers, and multiple groups of flow choking assemblies are arranged in each helical pipe at an interval; and an outer sleeve sleeved outside the helical pipes in the outermost layer.

Optionally, the mixing pipeline comprises a central pipe vertically arranged along the central axis of the mixing pipeline, and the helical pipes are wound around the central pipe.

Optionally, the outer sleeve is a straight pipe, and the central pipe is a straight pipe.

Optionally, the mixing pipeline is located at a horizontal center of the mixing chamber.

Optionally, every two adjacent groups of choking assemblies are spaced apart from each other by ¼ spiral.

Optionally, each group of choking assemblies comprise an even number of choking columns, the axial direction of each choking column is arranged in the radial direction of the cross section of the helical pipe, and the even number of choking columns are symmetrically distributed on the cross section of the helical pipe.

Optionally, the cross section of the choking column is circular, triangular, T-shaped or trapezoidal.

Optionally, the length of the choking column is ¼ to ⅓ of the diameter of the corresponding helical pipe.

Optionally, the width of the choking column is 0.1 to 0.3 times of the diameter of the corresponding helical pipe.

Optionally, the diameter of the helical pipes in the outermost layer is the same as that of the central pipe.

According to a second aspect of the present invention, the present invention provides a continuous gas separation system combining hydrate-based process and reverse osmosis process, which comprises: a hydrate formation loop, with the disturbance device according to any of the above-mentioned technical schemes arranged at an inlet of the hydrate formation loop and a separator arranged on the hydrate formation loop, wherein a first inlet of the separator is connected to a gas feed unit, a second inlet of the separator is connected to an outlet of the hydrate formation loop, and a first outlet and a second outlet of the separator are connected to the jet mixers; a three-phase separator, the inlet of which is connected to a third outlet of the separator; and a hydrate decomposition module connected to a hydrate outlet of the three-phase separator.

Optionally, the continuous gas separation system combining hydrate-based process and reverse osmosis process further comprises a membrane separation unit, which is connected to a gas mixture outlet of the three-phase separator, and the membrane separation unit is provided with a product gas outlet.

Optionally, the continuous gas separation system combining hydrate-based process and reverse osmosis process further comprises: a recycling unit for recycling non-product gasses from the membrane separation unit and the hydrate decomposition module.

Optionally, the hydrate formation loop is a tubular reaction loop.

Optionally, the hydrate formation loop is provided with an external thermal insulation device.

Optionally, the hydrate formation loop is provided with a sight window, which has a pressure withstand rating higher than or equal to 20 MPa.

Optionally, a gas circulating pump is arranged between the first outlet of the separator and the jet mixers; and a magnetic circulating pump is arranged between the second outlet of the separator and the jet mixers.

Optionally, the hydrate formation loop is provided with a constant dosing module, which injects water and a promoter into the hydrate formation loop, and is connected to a liquid outlet of the hydrate decomposition module.

Optionally, the constant dosing module comprises a high-capacity constant-flux pump and a plunger pump.

Optionally, the promoter is tetrahydrofuran and/or tetrabutylammonium bromide.

Optionally, an emergency discharge unit and a back pressure unit are arranged between the gas feed unit and the first inlet of the separator.

Optionally, the gas feed unit is a gas cylinder, which is connected to the first inlet of the separator via a gas boosting pump when the pressure in the gas cylinder is inadequate.

Compared with the prior art, the present invention attains the following beneficial effects:

1. The disturbance device in the present invention utilizes jet mixers, a mixing chamber and a mixing pipeline for multi-stage coordinated mixing; two mixed streams mixed by the jet mixers flow toward and impact each other at a high speed, an extremely high relative speed between the phases is reached at the moment of impact in the mixing chamber, thereby inter-phase transfer is strengthened; the helical pipes with different pipe diameters in the mixing pipeline not only strengthen radial mixing but also generate Dean vortexes, thereby the turbulence in the pipes is strengthened; the choking assemblies arranged in the helical pipes separate the Dean vortexes and form alternating separated vortexes in the reversed direction to promote gas-liquid contact and mixing, thereby gas-liquid mass transfer is increased and the hydrate formation efficiency is improved.

2. The intensity of the Dean vortexes in the helical pipes is related with the inner diameters of the helical pipes and the diameters of the spirals; in the present invention, the pipe diameters of the helical pipes increase gradually from the inner layers to the outer layers, and the diameters of the spirals also increase gradually from the inner layers to the outer layers, therefore the vortex intensities of the Dean vortexes generated by the helical pipes with different pipe diameters are equivalent to each other, and efficient fluid mixing is strengthened; since the times for the medium to flow through the helical pipes with different diameters are different from each other, axial sub-mixing is increased to a certain degree.

3. The continuous gas separation system combining hydrate-based process and reverse osmosis process in the present invention realizes coupling between hydrate separation for lean gas and membrane separation for rich gas, can overcome the drawbacks of a pure hydrate process, such as inefficient gas separation at a low concentration and additional pressurization, etc. The system provided by the present invention include an entire process covering formation, separation and decomposition, realizes continuous gas separation, and is suitable for large-scale industrial application.

4. By using a hydrate formation loop, the detention time for gas-liquid contact is increased, and the update rate of the gas-liquid interface is higher, favorable for continuous, efficient and quick hydrate formation.

The above description is only a summary of the technical scheme of the present invention. Hereunder one or more preferred embodiments will be presented and described with reference to the accompanying drawings in detail, in order to make the technical means of the present invention understood more clearly and implemented on the basis of the description, and make the above-mentioned and other objects, technical features and advantages of the present invention understood more easily.

REFERENCE NUMBERS

10—gas cylinder, 11—gas boosting pump, 12—emergency discharge unit, 13—back pressure unit, 20—disturbance device, 21—jet mixer, 22—mixing chamber, 23—mixing pipeline, 231—central pipe, 232—helical pipe, 2321—choking column, 233—outer sleeve, 30—hydrate formation loop, 31—separator, 311—gas circulating pump, 312—magnetic circulating pump, 32—thermal insulation device, 331—water, 332—high-capacity constant-flux pump, 333—promoter, 334—plunger pump, 40—three-phase separator, 50—hydrate decomposition module, 60—membrane separation unit, 61—product gas outlet, 70—recycling unit.

EMBODIMENTS

Hereunder some specific embodiments of the present invention will be detailed with reference to the accompanying drawings. However, it should be understood that the scope of protection of the present invention is not limited to those embodiments.

Unless otherwise expressly stated, throughout the specification and claims, the term "comprise" or "include" or their variants such as "comprising" or "including" shall be understood as including the enumerated elements or components, without excluding other elements or components.

In this document, for the convenience of description, spatially relative terms such as "underside", "below", "bottom", "upside", "above", and "top", etc., may be used to describe the relationship between one element or feature and another element or feature in the drawings. It should be understood that the spatially relative terms are intended to include different directions of the objects in use or operation other than the directions depicted in the drawings. For example, if an object in a drawing is turned upside down, an element described as "below" or "downside" other elements or features will be oriented "above" the elements or features. Therefore, the exemplary term "below" may include "below" and "above" directions. Objects may also have other orientations (rotated by 90 degrees or other orientations), and the spatially relative terms used herein should be interpreted accordingly.

In this document, the terms "first", "second", etc. are used to distinguish two different elements or parts, rather than to define a specific position or relative relationship. In other words, in some embodiments, the terms "first", "second", etc. may also be interchanged with each other.

Figure 1:
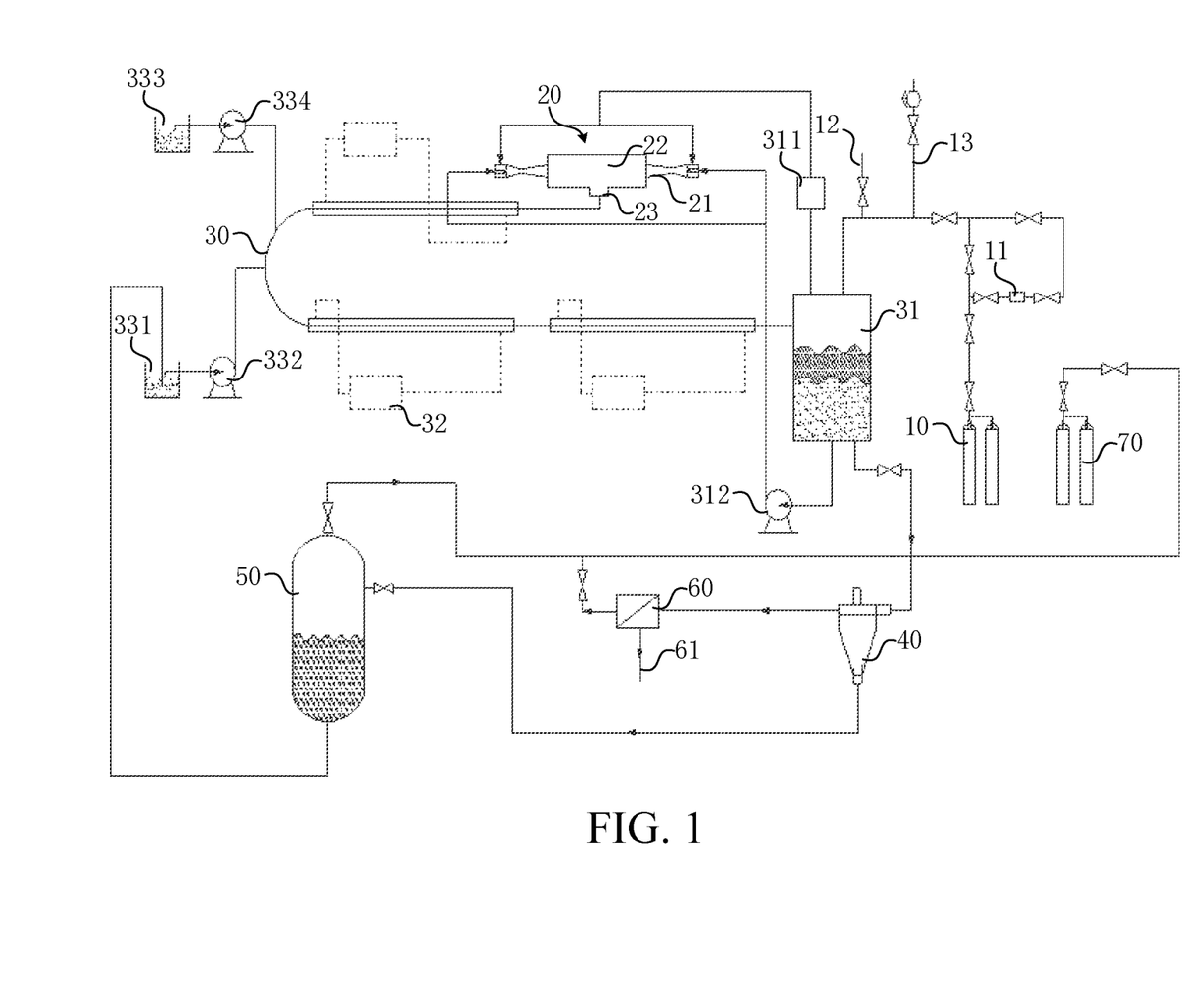
FIG. 1 is a schematic diagram of the continuous gas separation system combining hydrate-based process and reverse osmosis process according to an embodiment of the present invention.

As shown in FIG. 1, the continuous gas separation system combining hydrate-based process and reverse osmosis process according to an embodiment of the present invention comprises a hydrate formation loop 30, with a disturbance device 20 arranged at the inlet of the hydrate formation loop 30 and a separator 31 arranged on the hydrate formation loop 30. A first inlet of the separator 31 is connected to a gas feed unit, which, for example, comprises a gas cylinder 10. A second inlet of the separator 31 is connected to an outlet of the hydrate formation loop 30, and a first outlet and a second outlet of the separator 31 are connected to a disturbance device 20. A third outlet of the separator 31 is connected to the inlet of a three-phase separator 40, a hydrate outlet of the three-phase separator 40 is connected to a hydrate decomposition module 50, a gas mixture outlet of the gas mixture outlet is connected to a membrane separation unit 60, and the membrane separation unit 60 is provided with a product gas outlet 61. The hydrate decomposition module 50 is used to decompose the generated hydrate slurry, and the membrane separation unit 60 is used to further separate the generated lean gas. By using a hydrate process in combination with a membrane process, coupling between hydrate separation for rich gas and membrane separation for lean gas can be realized, thereby the drawback of poor separation efficiency in the separation through a single process is overcome.

Figure 2:
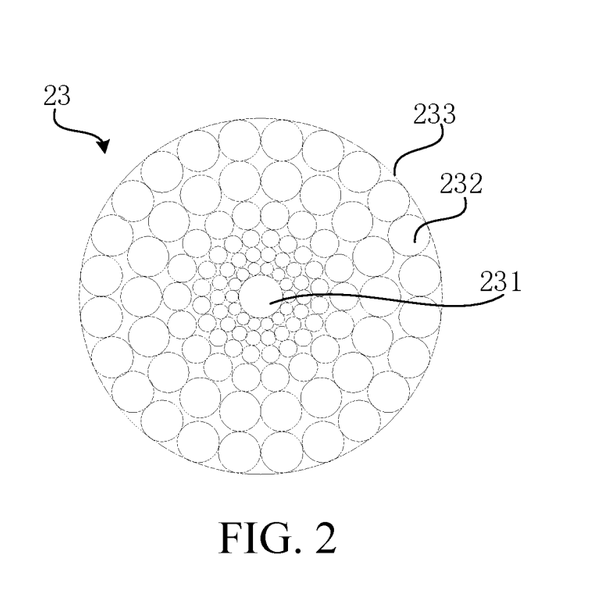
FIG. 2 is a top view of the structure of the mixing pipeline according to the embodiment of the present invention.
Figure 3:
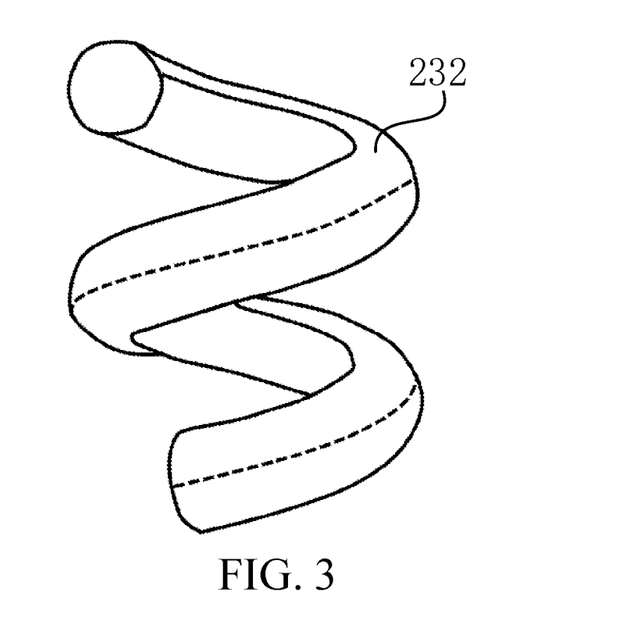
FIG. 3 is a schematic structural diagram of the helical pipe according to the embodiment of the present invention.
Figure 4:
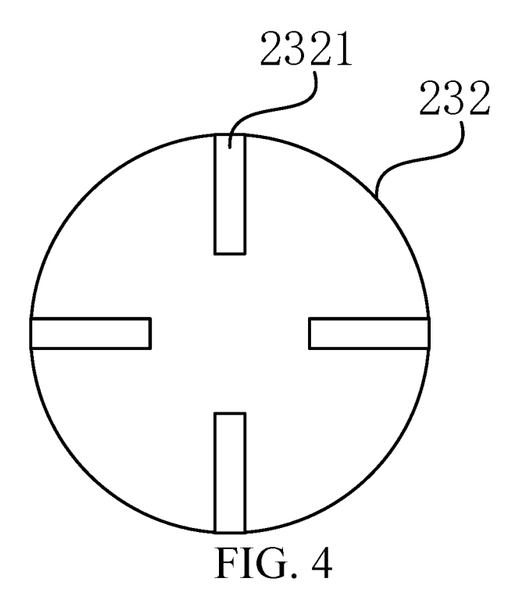
FIG. 4 is a schematic diagram of the cross section of the helical pipe according to the embodiment of the present invention, showing a group of choking assemblies on the cross section.

As shown in FIGS. 2-4, the disturbance device 20 according to an embodiment of the present invention comprises two jet mixers 21, a mixing chamber 22, and a mixing pipeline 23, wherein the mixing chamber 22 is connected between the two jet mixers 21, and the mixing pipeline 23 is connected below the mixing chamber 22. The jet mixers 21 are devices for mixing two or more liquids or gasses; two mixed streams are jetted by the two jet mixers 21 toward each other at a high speed in the horizontal direction, and impact each other in the mixing chamber 22, an extremely high relative speed between the phases is reached at the moment of impact, thereby inter-phase transfer is strengthened. The fluid in the mixing chamber 22 enters the mixing pipeline 23. For example, the mixing pipeline 23 is located at the horizontal center of the mixing chamber 22. In one or more embodiments of the present invention, the mixing pipeline 23 comprises a central pipe 231, a plurality of helical pipes 232, and an outer sleeve 233, which are arranged from inside to outside sequentially. The central pipe 231 is a straight pipe arranged vertically, the plurality of helical pipes 232 are arranged in multiple layers and wound outside the central pipe 231, the pipe diameters of the helical pipes 232 in multiple layers increase gradually from the inner layers to the outer layers, and the outer sleeve 233 is a straight pipe sleeved outside helical pipes 232 in the outermost layer. Multiple groups of choking assemblies are arranged at an interval in each helical pipe 232.

Furthermore, in one or more exemplary embodiments of the present invention, every two adjacent groups of choking assemblies are spaced apart from each other by ¼ spiral, i.e., a group of choking assemblies is arranged at each position of 90° turn of the helical pipe 232. Furthermore, in one or more exemplary embodiments of the present invention, each group of choking assemblies may consist of an even number of choking columns 2321, the axial direction of each choking column 2321 is arranged in the radial direction of the cross section of the helical pipe 232, and the even number of choking columns 2321 in each group of choking assemblies are symmetrically distributed on the cross section of the helical pipe 232. In the embodiment shown in FIG. 4, each group of choking assemblies comprise four choking columns 2321 evenly distributed on the cross section of the helical pipe 232, and every two adjacent choking columns 2321 are separated by 90°. However, it should be understood that the present invention is not limited to that arrangement. The direction of arrangement of the choking columns 2321 is perpendicular to the flow direction of the main fluid in the helical pipes 232. When the fluid flows through the helical pipes, two vortices rotating in opposite directions are generated owing to the unbalanced pressure gradient of the fluid perpendicular to the flow direction and the effect of centrifugal force, i.e., secondary flows and Dean vortexes are formed, and the velocity field and pressure field in the helical pipes change; in nature, the secondary flows are side flows perpendicular to the direction of the main stream. The generated Dean vortexes improve the mass transfer and heat transfer performance of the fluid and strengthen gas-liquid contact and mixing. A Dean Number describes the relationship between centrifugal force and viscous force in the process of fluid flow, and can be used to characterize the intensity of the Dean vortex. The Dean Number is related with the pipe diameter of the helical pipe and the diameter of the spiral. The pipe diameters of the helical pipes increase gradually from the inner layers to the outer layers, and the diameters of the spirals also increase gradually from the inner layers to the outer layers, thereby the intensities of the vortexes generated in the multiple layers of helical pipes are equivalent to each other, and efficient mixing of the fluid is promoted. The symmetrically distributed choking columns arranged in the helical pipes separate the two Dean vortexes generated in the helical pipes and destroy the disturbance of the Dean vortexes to the fluid. Alternating vortices in the reversed direction (i.e., separated vortexes) are formed behind the choking columns, and, under the separation effect of the choking columns, extensive fluid contact is achieved and the mixing is further strengthened by redistribution. Then, Dean vortexes are generated again in the fluid under the effect of the secondary flows in the helical pipes, and then separated vortexes are formed under the action of the choking columns, and so on. In that way, the fluid flows through the helical pipes. Gas-liquid mixed media with different turbulent intensities take different times to flow through the mixing pipeline, thereby the sub-mixing in the axial direction is strengthened.

Furthermore, in one or more exemplary embodiments of the present invention, the cross-sectional shape of the choking columns 2321 is circular, triangular, T-shaped or trapezoidal. It should be understood that the present invention is not limited to those shapes, and the specific shape of the choking columns 2321 may be selected according to the actual requirement.

Furthermore, in one or more exemplary embodiments of the present invention, the length of the choking columns 2321 is ¼ to ⅓ of the pipe diameter of the corresponding helical pipe 232. Furthermore, in one or more exemplary embodiments of the present invention, the width of the choking columns 2321 is 0.1 to 0.3 times of the pipe diameter of the corresponding helical pipe 232. The width of a choking column 2321 refers to the width of the flow-facing surface of the choking column. For example, in the case that the choking column is a circular column, the width of the choking column is the diameter of the circular column; in the case that the choking column is a triangular column, the width of the choking column is the length of the bottom edge of the flow-facing surface of the choking column.

Furthermore, in one or more exemplary embodiments of the present invention, the diameter of the helical pipes 232 in the outermost layer is the same as that of the central pipe 231.

As shown in FIG. 1, in one or more embodiments of the present invention, the continuous gas separation system combining hydrate-based process and reverse osmosis process further comprises a recycling unit 70, which is used to recycle the non-product gasses from the membrane separation unit 60 and the hydrate decomposition module 50, so as to avoid polluting the environment.

Furthermore, in one or more exemplary embodiments of the present invention, the hydrate formation loop 30 may be a tubular reaction loop. Preferably, but not limitingly, the tubular reaction loop is designed to be disassemble and replaceable, so that the pipes can be replaced with other pipes different in diameter as required. The pressure rating of the pipeline is MPa, and the working temperature of the pipeline is −20 to 90° C. The tubular reaction loop may be made of stainless steel 316, but the present invention is not limited to that. Furthermore, in one or more exemplary embodiments of the present invention, the hydrate formation ring 30 is provided with an external thermal insulation device to keep the temperature constant. For example, the thermal insulation device 32 may be a high-low temperature integrated bath, which works at −20 to 90° C. working temperature, and has overheat protection, overload protection, and other functions. Furthermore, in one or more exemplary embodiments of the present invention, the hydrate formation loop 30 is provided with a sight window (not shown), which has a pressure withstand rating higher than or equal to 20 MPa. The sight window is mainly used to observe the flow condition and the hydrate formation condition in the hydrate formation loop 30.

Furthermore, in one or more exemplary embodiments of the present invention, a gas circulating pump 311 is provided between the first outlet of the separator 31 and the jet mixers 21; and a magnetic circulating pump 312 is arranged between the second outlet of the separator 31 and the jet mixers 21.

Furthermore, in one or more exemplary embodiments of the present invention, the hydrate formation loop 30 is provided with a constant dosing module, which injects a promoter 333 into the hydrate formation loop 30 via a plunger pump 334, and injects water 331 into the hydrate formation loop 30 via a high-capacity constant-flux pump 332. The constant dosing module may be connected to the liquid outlet of the hydrate decomposition module 50, so as to realize water recycling and reuse in the system. It should be understood that the present invention is not limited to that arrangement, and the specific type of the pump may be selected according to the actual requirement. Furthermore, in one or more exemplary embodiments of the present invention, the promoter 333 may be tetrahydrofuran and/or tetrabutylammonium bromide, but the present invention is not limited to it.

Furthermore, in one or more exemplary embodiments of the present invention, an emergency discharge unit 12 and a back pressure unit 13 are provided between the gas cylinder 10 of the gas feed unit and the first inlet of the separator 31.

Furthermore, in one or more exemplary embodiments of the present invention, when the pressure in the gas cylinder 10 is inadequate, the gas cylinder 10 is connected to the first inlet of the separator 31 via a gas boosting pump 11.

Embodiment 1

As shown in FIGS. 1 to 4, the working process of the continuous gas separation system combining hydrate-based process and reverse osmosis process in this embodiment is as follows:

The A/B gas mixture in the gas cylinder 10 enters the separator 31 through the first inlet; the A/B gas mixture in the separator 31 is pumped by the gas circulating pump 311 into the two jet mixers 21 through the first outlet, and the circulating liquid in the separator 31 is pumped by the magnetic circulating pump 312 into the two jet mixers 21 through the second outlet. The fluid streams mixed by the jet mixers 21 are jetted out and impact and mix with each other in opposite directions in the mixing chamber 22. After the impact, the streams enter the mixing pipeline 23 and is mixed. The fluid mixed by the disturbance device 20 enters the hydrate formation loop 30 to form a hydrate, and the constant dosing module supplements water 331 and the promoter 333 at a constant rate to the hydrate formation loop to ensure continuous circulation in the system. A hydrate A formed in the hydrate formation loop 30 enters the three-phase separator 40 together with a part of unreacted A/B gas mixture through the third outlet of the separator 31. After the hydrate A is separated from the A/B gas mixture in the three-phase separator 31, the A/B gas mixture enters the membrane separation unit 60 through the gas mixture outlet of the three-phase separator 31, and the hydrate A and its slurry enter the hydrate decomposition module 50 through the hydrate outlet of the three-phase separator 31. After the A/B gas mixture that contains low-concentration gas A enters the membrane separation unit 60 and is separated, the gas A enters the recycling unit 70 and is recycled, and the gas B is discharged through the product gas outlet 61 of the membrane separation unit 60 and is collected. The hydrate A and its slurry are decomposed into the gas A and water or a promoter solution in the hydrate decomposition module 50, then the gas A enters the recycling unit 70 and is recycled, while the water or promoter solution enters the constant dosing module and is reused.

The above description of the specific embodiments of the present invention is for the purpose of explanation and illustration. The description is not intended to limit the present invention to the disclosed specific forms; moreover, it is obvious that various modifications and alternations can be made in light of the above teaching. The exemplary embodiments are selected and described in order to explain the specific principle of the present invention and its practical application, so as to enable those skilled in the art to implement and utilize the exemplary embodiments of the present invention and make various choices and changes. Any simple modification, equivalent variation or refinement made to the above exemplary embodiments shall be deemed as falling in the scope of protection of the present invention.

The invention claimed is:

1. A disturbance device, comprising:
   two jet mixers arranged oppositely in the horizontal direction;
   a mixing chamber connected between the two jet mixers; and
   a mixing pipeline connected below the mixing chamber, comprising:
   a plurality of helical pipes arranged in multiple layers and wound around a central axis of the mixing pipeline, wherein the pipe diameters of the plurality of helical pipes increase gradually from the inner layers to the outer layers, and multiple groups of flow choking assemblies are arranged in each helical pipe at an interval; and an outer sleeve sleeved outside the helical pipes in the outermost layer.

2. The disturbance device according to claim 1, wherein the mixing pipeline comprises a central pipe vertically arranged along the central axis of the mixing pipeline, and the helical pipes are wound around the central pipe.

3. The disturbance device according to claim 2, wherein the outer sleeve is a straight pipe, and the central pipe is a straight pipe.

4. The disturbance device according to claim 1, wherein the mixing pipeline is located at a horizontal center of the mixing chamber.

5. The disturbance device according to claim 1, wherein every two adjacent groups of choking assemblies are spaced apart from each other by ¼ spiral.

6. The disturbance device according to claim 1, wherein each group of choking assemblies comprise an even number of choking columns, the axial direction of each choking column is arranged in the radial direction of the cross section of the helical pipe, and the even number of choking columns are symmetrically distributed on the cross section of the helical pipe.

7. The disturbance device according to claim 1, wherein the cross section of the choking column is circular, triangular, T-shaped or trapezoidal.

8. The disturbance device according to claim 1, wherein the length of the choking column is ¼ to ⅓ of the diameter of the corresponding helical pipe.

9. The disturbance device according to claim 6, wherein the width of the choking column is 0.1 to 0.3 times of the diameter of the corresponding helical pipe.

10. The disturbance device according to claim 1, wherein the diameter of the helical pipes in the outermost layer is the same as that of the central pipe.

11. A continuous gas separation system combining hydrate-based process and reverse osmosis process, comprising:
    a hydrate formation loop, with the disturbance device according to claim 1 arranged at an inlet of the hydrate formation loop and a separator arranged on the hydrate formation loop, wherein a first inlet of the separator is connected to a gas feed unit, a second inlet of the separator is connected to an outlet of the hydrate formation loop, and a first outlet and a second outlet of the separator are connected to the jet mixers;
    a three-phase separator, the inlet of which is connected to a third outlet of the separator; and
    a hydrate decomposition module connected to a hydrate outlet of the three-phase separator.

12. The continuous gas separation system combining hydrate-based process and reverse osmosis process according to claim 11, further comprising a membrane separation unit, which is connected to a gas mixture outlet of the three-phase separator and provided with a product gas outlet.

13. The continuous gas separation system combining hydrate-based process and reverse osmosis process according to claim 12, further comprising:
    a recycling unit for recycling non-product gasses from the membrane separation unit and the hydrate decomposition module.

14. The continuous gas separation system combining hydrate-based process and reverse osmosis process according to claim 11, wherein the hydrate formation loop is a tubular reaction loop.

15. The continuous gas separation system combining hydrate-based process and reverse osmosis process according to claim 11, wherein the hydrate formation loop is provided with an external thermal insulation device.

16. The continuous gas separation system combining hydrate-based process and reverse osmosis process according to claim 11, wherein the hydrate formation loop is provided with a sight window, which has a pressure withstand rating higher than or equal to 20 MPa.

17. The continuous gas separation system combining hydrate-based process and reverse osmosis process according to claim 11, wherein a gas circulating pump is arranged between the first outlet of the separator and the jet mixers; and a magnetic circulating pump is arranged between the second outlet of the separator and the jet mixers.

18. The continuous gas separation system combining hydrate-based process and reverse osmosis process according to claim 11, wherein the hydrate formation loop is provided with a constant dosing module, which injects water and a promoter into the hydrate formation loop, and is connected to a liquid outlet of the hydrate decomposition module, wherein the constant dosing module comprises a high-capacity constant-flux pump and a plunger pump, wherein the promoter is tetrahydrofuran and/or tetrabutylammonium bromide.

19. The continuous gas separation system combining hydrate-based process and reverse osmosis process according to claim 11, wherein an emergency discharge unit and a back pressure unit are arranged between the gas feed unit and the first inlet of the separator.

20. The continuous gas separation system combining hydrate-based process and reverse osmosis process according to claim 11, wherein the gas feed unit is a gas cylinder, which is connected to the first inlet of the separator via a gas boosting pump when the pressure in the gas cylinder is inadequate.

\* \* \* \* \*